H. G. HAMER.
SLACK ADJUSTER FOR RAILWAY BRAKES.
APPLICATION FILED AUG. 18, 1909.

944,609.

Patented Dec. 28, 1909.
2 SHEETS—SHEET 1.

Witnesses
L. B. James
L. N. Gillis

Inventor
Harvey G. Hamer
By
Attorneys

H. G. HAMER.
SLACK ADJUSTER FOR RAILWAY BRAKES.
APPLICATION FILED AUG. 18, 1909.
944,609.
Patented Dec. 28, 1909.
2 SHEETS—SHEET 2.
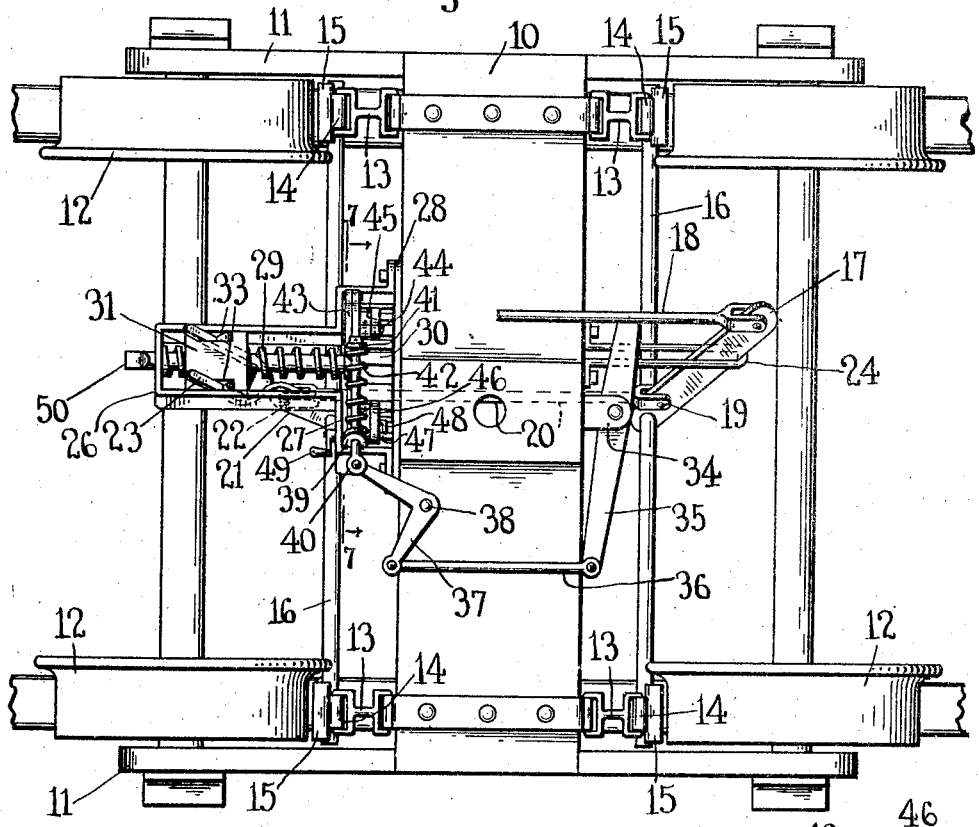
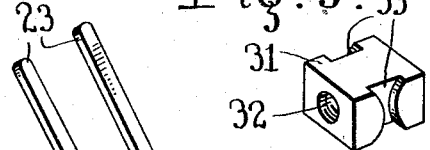
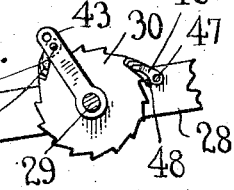
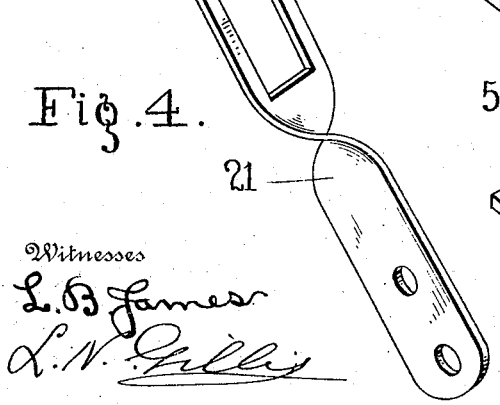
Witnesses
L. B. James
L. N. Gillis
Inventor
Harvey G. Hamer
By Chandler & Chandler
Attorneys

UNITED STATES PATENT OFFICE.

HARVEY G. HAMER, OF HOOVERSVILLE, PENNSYLVANIA.

SLACK-ADJUSTER FOR RAILWAY-BRAKES.

944,609.           Specification of Letters Patent.     Patented Dec. 28, 1909.

Application filed August 18, 1909. Serial No. 513,458.

*To all whom it may concern:*

Be it known that I, HARVEY G. HAMER, a citizen of the United States, residing at Hooversville, in the county of Somerset, State of Pennsylvania, have invented certain new and useful Improvements in Slack-Adjusters for Railway - Brakes; and I do hereby declare the following to be a full, clear, and exact description of the invention, such as will enable others skilled in the art to which it appertains to make and use the same.

This invention relates to railroad brakes such as are used on railway and other cars, and has special reference to an automatic slack adjuster whereby any slack in the brake mechanism may be automatically taken up.

One object of the invention is to provide a means operable by the movement of a brake lever to adjust the slack in the brake mechanism.

Another object of the invention is to provide a means whereby the fulcrum of a brake lever may be shifted when slack exists in the brake mechanism, said means ceasing to operate when the proper adjustment of the brakes has been attained.

A third object of this invention is to provide a means of this character which can be readily applied to any existing brake arrangement.

With the above and other objects in view the invention consists in general of a brake mechanism and certain other mechanism operable by the movement of a brake lever to vary the position of the fulcrum of that lever, the latter mechanism lying beyond the limit of movement of the lever when the brakes are in proper adjustment and being in position to be actuated thereby when slack exists in the brake mechanism.

The invention further consists in certain novel details of construction and combinations of parts hereinafter fully described, illustrated in the accompanying drawings, and specifically set forth in the claims.

In the accompanying drawings, like characters of reference indicate like parts in the several views, and:—Figure 1 is a side elevation of a car truck equipped with this invention, certain of the parts of the truck being omitted more clearly to show the application of the device. Fig. 2 is an end view thereof. Fig. 3 is a top plan view thereof. Fig. 4 is a view of the fulcrum adjusting lever. Fig. 5 is a view of a certain lever actuating block used with this invention. Fig. 6 is a perspective view of a housing adapted to cover the working parts of this invention. Fig. 7 is a section on the line 7—7 of Fig. 3. Fig. 8 is a detail perspective of the locking pawls and means for lifting the same.

The numeral 10 indicates an ordinary type of truck bolster which is supported on truck frames 11 carried by the usual wheels 12. As previously noted, certain parts of the truck frames are omitted more clearly to show the application of the device, and the form of frame is purely conventional as the same forms no part of this invention.

Depending from the truck bolster 10 are brake hangers 13 wherefrom are swung brake blocks 14 provided with the usual brake shoes 15. These brake blocks are connected by some ordinary type of brake beam as indicated at 16 and the parts thus far described may be of the ordinary character.

At 17 is a live brake lever one end of which is attached to the forward set of brake shoes and to the upper end of this lever is attached the usual secondary brake rod 18. At 19 is a fulcrum pin for the lever 17 and this fulcrum pin is connected to one end of a lower brake rod 20. The rear or dead brake lever is of peculiar construction and the lower end thereof is attached to the rear brake beam 16, the lever being indicated at 21, and this lever is likewise provided with a fulcrum pin 22 whereto the free end of the lower brake rod 20 is attached. The upper end of this lever is twisted to lie substantially at right angles to the plane of the lower end and this upper end is forked to form a pair of parallel arms 23.

Secured to the truck bolster is the usual brake lever guide 24 and in place of this guide on the rear of the truck bolster there is provided a frame comprising a U-shaped central portion 26 having outwardly extending portions 27 so that the entire device is provided with an opening in the shape of the letter T. This frame 26 is also provided with a base plate 28 and both frame and base plate are bolted firmly to the truck bolster. Both the frame and base plate are furthermore provided with suitable alined perforations to receive a screw 29 whereon is fixedly mounted a ratchet 30 and on this screw moves a sliding block or nut 31 having an opening 32 threaded for the reception of the screw. This block furthermore is provided with lateral recesses 33 to receive the arms 23 and these recesses have oppositely curved sides as can be clearly seen by reference to Fig. 5, the purpose of these sides being to permit variations in the angle of the arms with relation to the block. The lower end of the lever 21 is attached to the rear brake beam 16 and it will now be apparent, from an inspection of Fig. 1, that if the forked end of the lever 21 be moved toward the bolster the fulcrum pin 19 will also tend to move in the same direction so that if the secondary brake rod 18 be held stationary the front brake shoes 15 will be brought into contact with the front wheels 12 of the truck. At the same time if this movement continues the fulcrum pin 19 will cease to move forward and the rear brake shoes 15 will be forced into contact with the rear wheels 12. Now, since the entire device is flexible these operations will take place substantially in a simultaneous manner. That is to say, the brake shoes 15 will each be forced toward their respective wheels as the block 31 is moved toward the bolster 10. Furthermore, as is common in brake mechanism, if one pair of brake shoes does not engage tightly the slack will be distributed between both pairs. In order to actuate this screw when slack exists there is provided a bracket 34 whereon is pivoted a lever 35. This lever is arranged to have one end lie in the path of the brake lever 17 and this end is so positioned that when the brakes are properly adjusted the movement of the brake lever will not move the lever 35 but, when slack exists in the brakes, the brake lever 17 will strike the end of the lever 35 and move the same. To the end of this lever opposite that which is struck by the brake lever 17 is attached one arm of a bell crank lever 37 pivoted to the bolster 10 as at 38. At 39 is a guide eye and through this guide eye passes a second link 40 which is pivoted to the free arm of the bell crank lever 37. Upon this second link is a collar 41 and between the collar and guide eye is a spring 42 which normally presses the collar away from the guide eye and causes, through the medium of the bell crank lever 37 and link 36, the lever 35 to rest in such position that the brake lever 17 will actuate the same when the brakes are slack. The free end of the link 40 is connected to a swinging arm 43 pivoted on a cylindrical portion of the screw 29 and on this arm 43 is carried a pin 44 whereon are mounted pawls 45, these pawls being so arranged that they are of unequal lengths so that the ratchet has the same value as a ratchet with a much greater number of teeth. Now, if it be supposed that slack exists in the brake mechanism the brake lever 17 will require to be moved more than the regular amount in order to properly set the brakes. If this be the case, as the brake lever is moved to set the brakes this lever will contact with the end of the lever 35 which lies in its path and will thus actuate, through the connected links and levers, the arm 43 and in consequence the pawls will be drawn back over the ratchet until one or the other engages the ratchet teeth. When the brakes are released the spring 42 will force the pawls forward and thus turn the ratchet, which being fixed to the screw, will in turn operate the screw and cause the block 31 to move inward. By this means any slack existing is compensated for by the movement of the lever 35 and consequently of the block 31.

In order to hold the ratchet in adjusted position while the pawls 45 are being drawn back thereover other pawls are provided. These pawls are indicated at 46 and are of the same arrangement as the pawls 45. The pawls 46 are mounted on a shaft 47 on which they are freely rotatable. In order to disengage these pawls from the ratchet this shaft is provided with an L-shaped arm 48 which normally rests below and clear of the pawls but the shaft is further provided with a crank handle 49 which may be grasped and moved to rotate the shaft and bring the arm 48 up underneath the pawls and raise the same from the ratchet. The pawls 45 may be lifted from the ratchet by hand or by means of a suitable tool, it not being deemed necessary to make provision for mechanically lifting them. If the brakes become, for any reason, set too tight, the two sets of pawls may be raised from the ratchet and a crank applied to the end of the screw and rotated, the end being squared or otherwise shaped to receive such a crank as indicated at 50.

In order to protect this mechanism from dirt and dust a casing is provided which is shown in Fig. 6, and this casing is T-shaped in plan so that it fits closely over the frame 26 to which it may be secured by suitable bolts or screws passing through openings therein. The casing is indicated in Fig. 6 at 51 and the bolt openings at 52. This casing is furthermore provided with a small sliding door 53 so positioned as to afford ready access to the pawls, so that a suitable tool may be inserted for raising the pawls from the ratchet.

From the foregoing the operation of the device, when slack exists in the brake mechanism, will be apparent. It will also be obvious that when the proper adjustment of the brakes has been made the lever 17 will no longer strike the lever 35 and consequently no further tightening of the brakes will take place until they again become slack. It is thus seen that this mechanism is operable by the movement of the brake lever and varies the position of the brake lever fulcrum, and that this mechanism lies beyond the limit of movement of the lever when the brakes are in proper adjustment. There has thus been provided a simple and efficient device of the kind described and for the purpose specified.

Having thus described the invention, what is claimed as new, is:—

1. In a slack adjuster, a brake mechanism including a live lever, a fulcrum therefor, an operating lever operable by the movement of the live lever when the brake is slack, and a step by step mechanism actuated by the operating lever to move said fulcrum and tighten said brake mechanism, said step by step mechanism including a link connected to said fulcrum, a dead lever connected to said link, a sliding block operatively connected to one end of the dead lever, a screw on which said block is mounted for movement, a ratchet fixed to said screw, and pawls operatively connected to said operating lever and engaged with the ratchet.

2. In a slack adjuster, a brake mechanism including a live lever, a fulcrum therefor, an operating lever operable by the movement of the live lever when the brake is slack, and a step by step mechanism actuated by the operating lever to move said fulcrum and tighten said brake mechanism, said step by step mechanism including a link connected to said fulcrum, a dead lever connected to said link, a sliding block operatively connected to one end of the dead lever, a screw on which said block is mounted for movement, a ratchet fixed to said screw, a swinging arm on said screw, a pawl on said arm engaging the ratchet, a bell crank, a link connecting said bell crank and operating lever, a second link connecting said arm and bell crank, a fixed guide eye, a collar on said second link, and a spring between said guide eye and collar normally urging the pawl to rotate the ratchet.

In testimony whereof, I affix my signature, in presence of two witnesses.

HARVEY G. HAMER.

Witnesses:
L. N. GILLIS,
GEO. H. CHANDLEE.